(12) United States Patent
Schlepple et al.

(10) Patent No.: US 11,675,130 B2
(45) Date of Patent: Jun. 13, 2023

(54) SPLICING OPTICAL FIBERS TO PHOTONIC INTEGRATED CIRCUITS

(71) Applicant: Cisco Technology, Inc., San Jose, CA (US)

(72) Inventors: Norbert Schlepple, Macungie, PA (US); Vipulkumar K. Patel, Breinigsville, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/447,145

(22) Filed: Sep. 8, 2021

(65) Prior Publication Data

US 2023/0073957 A1 Mar. 9, 2023

(51) Int. Cl.
*G02B 6/255* (2006.01)
*G02B 6/12* (2006.01)

(52) U.S. Cl.
CPC ............. *G02B 6/2555* (2013.01); *G02B 6/12* (2013.01); *G02B 6/2551* (2013.01); *G02B 6/2553* (2013.01); *G02B 2006/12138* (2013.01); *G02B 2006/12192* (2013.01)

(58) Field of Classification Search
None
See application file for complete search history.

(56) References Cited

U.S. PATENT DOCUMENTS

| | | | | |
|---|---|---|---|---|
| 5,208,885 | A | * | 5/1993 | Dragone ............... G02B 6/2551 385/47 |
| 7,477,813 | B2 | * | 1/2009 | Monma ............... G02B 27/0994 385/23 |
| 9,322,994 | B2 | * | 4/2016 | Brooks ................ G02B 6/4292 |
| 9,766,410 | B1 | | 9/2017 | Chen |
| 2003/0185516 | A1 | * | 10/2003 | Kennedy .................. G02B 6/30 385/49 |
| 2019/0094468 | A1 | | 3/2019 | Novack et al. |
| 2020/0033538 | A1 | | 1/2020 | Spannagel et al. |
| 2020/0096702 | A1 | | 3/2020 | Dong et al. |

OTHER PUBLICATIONS

Juniyali Nauriyal, Meiting Song, Raymond Yu, Jaime Cardenas, "Fiber-To-Chip Fusion Splicing for Low-Loss Photonic Packaging," ResearchGate, dated Apr. 26, 2019, pp. 1-5.

* cited by examiner

*Primary Examiner* — Omar R Rojas
(74) *Attorney, Agent, or Firm* — Patterson + Sherdan, LLP

(57) ABSTRACT

Techniques for aligning each of a plurality of optical fibers for coupling to a photonic integrated circuit (PIC). Transmission is detected from each respective optical fiber to the PIC using a probe, and the respective optical fiber is aligned based on the detected transmission. Each of the plurality of optical fibers is coupled to the PIC using at least one of: (i) laser splicing, (ii) laser spot welding, or (iii) arc welding.

18 Claims, 11 Drawing Sheets

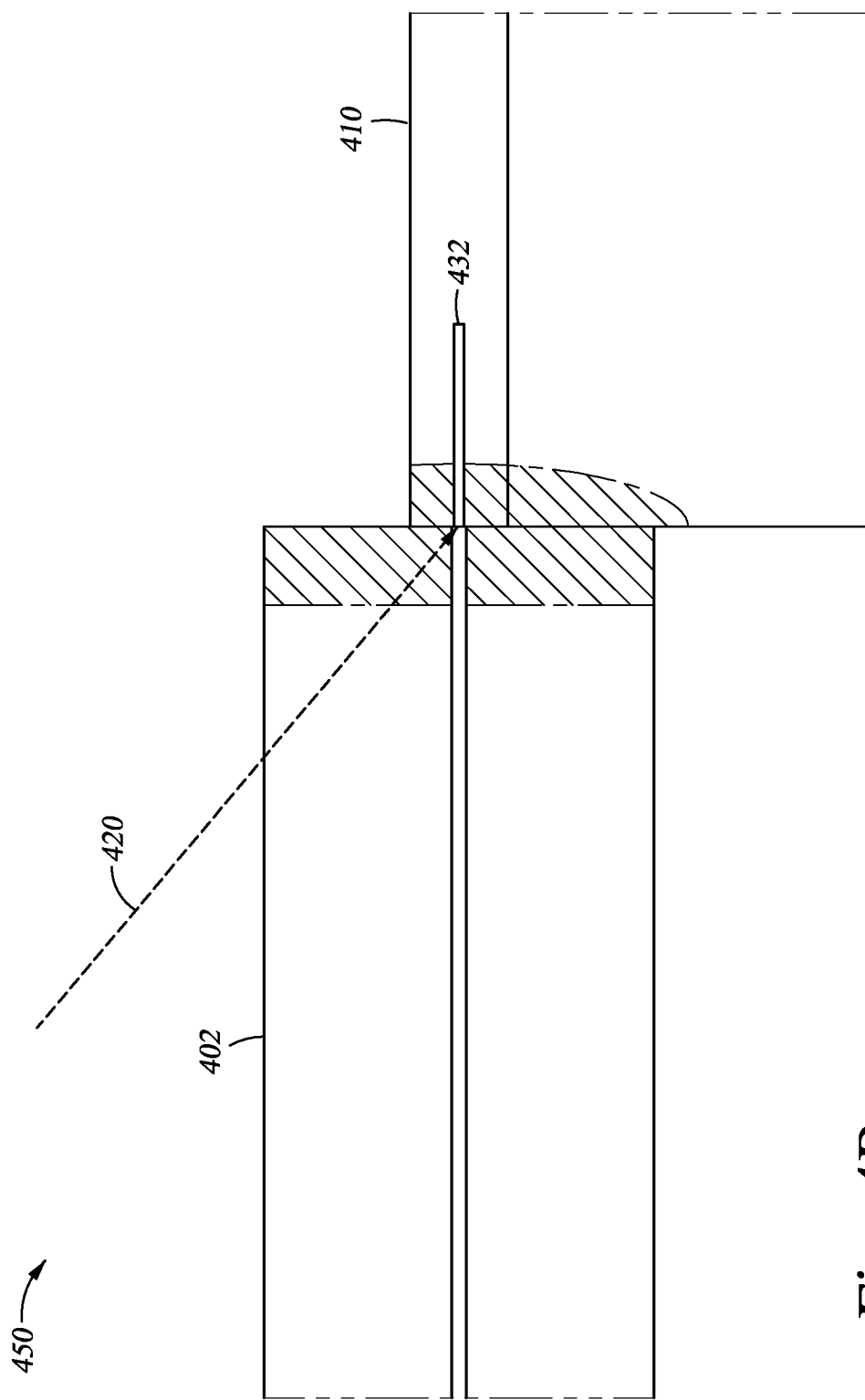

SPLICING OPTICAL FIBERS TO PHOTONIC INTEGRATED CIRCUITS

TECHNICAL FIELD

Embodiments presented in this disclosure generally relate to fiber optic communication. More specifically, embodiments disclosed herein relate to connection of optical fibers to photonic integrated circuits.

BACKGROUND

Connection of optical fibers to a photonic integrated circuit (PIC) can be a challenging problem. For example, PIC warpage can make connection of optical fibers using traditional techniques difficult and unreliable. As another example, limited package clearances can also make connection of optical fibers using traditional techniques very challenging. Further, pre-manufactured fiber array units (FAUs), used in traditional techniques for connecting optical fibers to a PIC, are dramatically increasing in cost as fiber counts increase, due to manufacturing complexity and yield. Finally, the use of index matching (IM) epoxy in traditional fiber to PIC coupling techniques creates serious power density concerns for high power laser supplies.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 4B illustrates a side view of laser splicing optical fibers to a PIC, according to one embodiment.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1A:
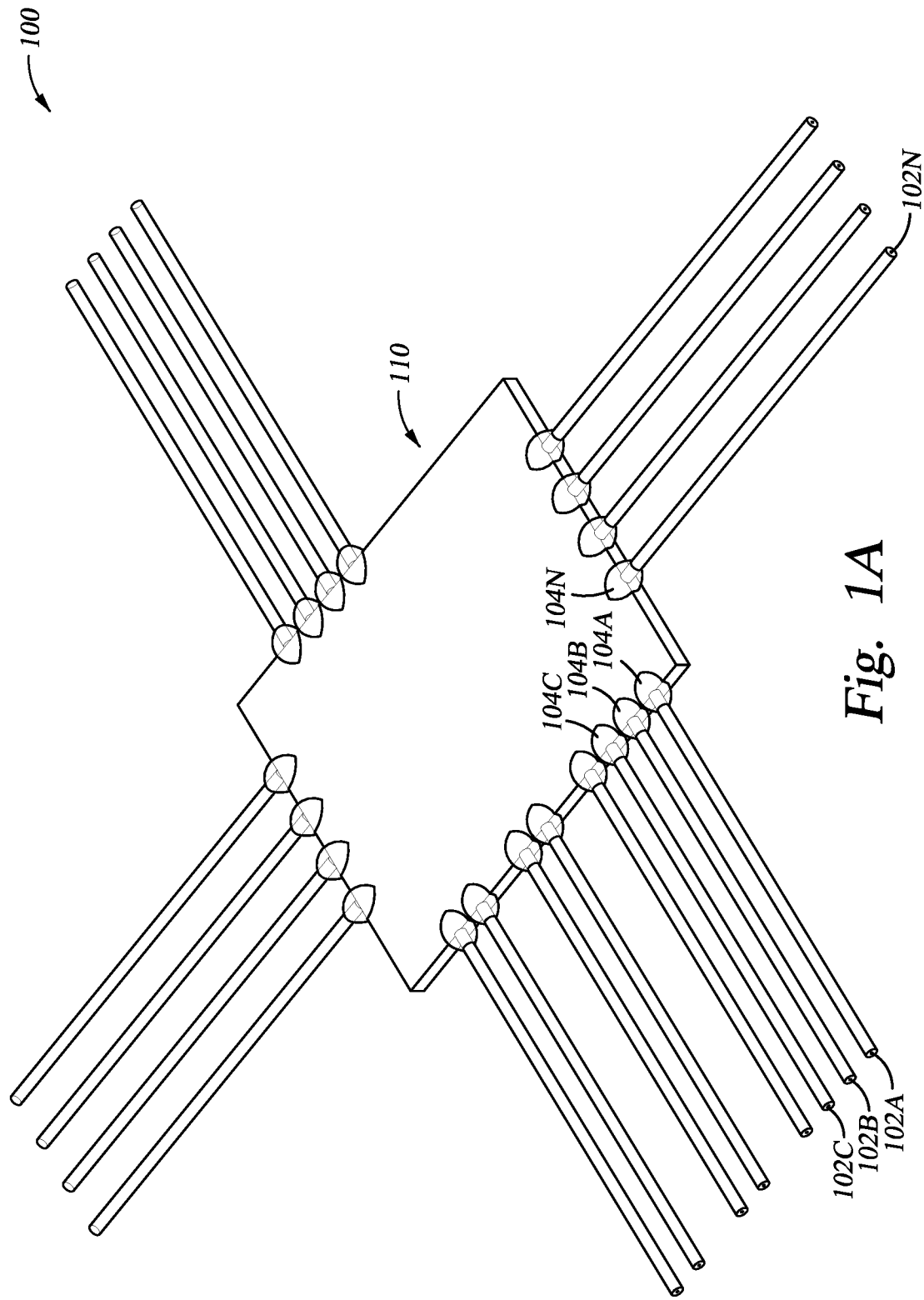
FIG. 1A illustrates an overview of splicing optical fibers to a PIC, according to one embodiment.

Embodiments include a method. The method includes aligning each of a plurality of optical fibers for coupling to a photonic integrated circuit (PIC). This includes detecting transmission from each respective optical fiber to the PIC using a probe, and aligning the respective optical fiber based on the detected transmission. The method further includes coupling each of the plurality of optical fibers to the PIC using at least one of: (i) laser splicing, (ii) laser spot welding, or (iii) arc welding.

Embodiments further include a further method. The method includes aligning each of a plurality of optical fibers for coupling to a photonic integrated circuit (PIC). This includes detecting transmission from each respective optical fiber to the PIC using a probe, and aligning the respective optical fiber based on the detected transmission. The method further includes coupling each of the plurality of optical fibers to the PIC, including identifying a failure in coupling a first optical fiber, of the plurality of optical fibers, to a first redundant waveguide on the PIC, and based on the identified failure, coupling the first optical fiber to a second redundant waveguide on the PIC. The first and second redundant waveguides are configured to provide an optical signal to a same endpoint on the PIC.

Embodiments further include a system. The system includes a photonic integrated circuit (PIC). The system further includes a plurality of optical fibers individually coupled to the PIC without using a fiber array unit (FAU). Each of the plurality of optical fibers is configured to be individually aligned with the PIC during coupling of the optical fibers to the PIC, and each of the plurality of optical fibers is aligned with the PIC using a probe to detect feedback from a respective optical fiber to the PIC.

EXAMPLE EMBODIMENTS

As noted above, PIC warpage can make connection of optical fibers using traditional techniques difficult and unreliable. Fiber counts per PIC have been continually increasing for higher optical density. This widens the optical contact area that needs to be maintained flat, to allow for a higher channel count. But the PIC trend towards more extreme aspect ratios (e.g., thinner dies and larger footprints), combined with traditional electronic integrated circuit (EIC) packaging techniques, can increase PIC warping. This PIC warping can increase both during assembly and packaging, and during operation (e.g., due to environmental temperature changes). PIC warpage can make connecting optical fibers using traditional pre-manufactured FAUs extremely challenging. FAUs are typically rigid, and warpage in the PIC makes alignment with waveguides in the PIC extremely challenging, and sometimes impossible. One solution, in some circumstances, is to force waveguides on the PIC to be arranged at a chip edge, in a compact and narrow-pitch array, but this can severely limit design of the PIC and efficiency of the PIC.

As another example, limited package clearances can also make connection of optical fibers using traditional techniques very challenging. Increasing channel speeds are driving packages to lower heights (e.g., lowering the height of the active plane on the PIC relative to a substrate surface) in order to maintain electrical signal integrity. This can create very limited clearance between the bare fiber and the package substrate, and can require non-standard electrical and optical packaging and limit mechanical support for attached fibers.

Further, use of pre-manufactured FAUs in traditional techniques is becoming expensive and potentially unreliable. For example, pre-manufactured FAU costs are scaling exponentially with fiber count (for numerous fiber types). This is because of the increased manufacturing complexity, and lower yield, associated with increasing fiber counts for pre-manufactured FAUs. At the same time, guaranteed fiber core accuracy within the FAU is decreasing as growing channel count adds additional coupling loss penalties. The use of pre-manufactured FAUs may be unfeasible for high channel count and specialty fibers (e.g., polarization maintaining fiber (PMF) and multi-core fiber (MCF)) due to performance limits.

Finally, the use of IM epoxy in traditional fiber to PIC coupling techniques can be problematic in high power environments. Traditional fiber-to-PIC coupling approaches that are not free space (E.g., FAU to grating, FAU to edge butt coupling, fiber in on-chip v-groove coupling) rely on epoxy as an IM between the fiber facet and the chip waveguide. But there are serious power density concerns for fiber power greater than 50 mW (e.g., due to epoxy burn out). This is an unresolved issue for high power environments (e.g., using a high power consolidated remote laser supply). And requiring the use of IM epoxy severely limits the options for materials, potentially increasing manufacturing expenses and making manufacturing vulnerable to material shortages.

One or more of these problems can be alleviated through techniques for splicing optical fibers to a PIC, as discussed further below. In an embodiment, one optical fiber (e.g., a single-mode optical fiber (SMF), PMF, or MCF) can be actively aligned to a respective waveguide using a scan algorithm. For example, an on-chip monitor photodiode provides feedback for the alignment loop. Individual optical fibers can be freely placed for preferred on-chip waveguide routing. Further, fibers can be attached to any one or more sides of a PIC, irrespective of PIC topology. For example, fibers can be attached without being affected by PIC warpage, or with reduced affects from PIC warpage. This is discussed further below with regards to FIGS. 5-6.

Further, in an embodiment, a fiber can be permanently attached to a PIC using an epoxy free techniques. For example, as discussed further below with regard to FIGS. 2-4, the fiber can be attached to the PIC using a laser weld, an arc weld, or any other suitable technique. In this example, a suitable catalyst material can be used to facilitate attachment and provide a permanent index match, without using IM epoxy. Applying the catalyst material can include dipping the fiber, the PIC, or both, in spin-on glass or using a glass frit. In an embodiment, the catalyst can be added prior to attachment and alignment.

Further, the fiber can be attached with a vertical offset to compensate for any asymmetry in the fiber and PIC overlap, and the fiber can be pushed into the PIC while the fiber is soft (e.g., during heating associated with welding) to close optical gaps and avoid voids. For example, the area near the of the fiber (e.g., also including the tip) can soften during heating and adapt to the topology of the PIC edge. This can close optical gaps and avoid forming gaps or voids. In an embodiment, the PIC can include local keep out zones around the attachment area (e.g., around the weld area) to protect sensitive layers (e.g., metal layers) and to confine and localize heat generated during welding. For example, $SiO_2$ has a higher thermal impedance than typical metal layers, so that maintaining keep out zones with $SiO_2$, and without metal layers, can protect the metal layers.

In an embodiment, individual fibers can be removed after a failure or insufficient attachment. Further, in an embodiment, the PIC can include redundant pairs of waveguide inputs, in which each waveguide provides an input optical signal (e.g., received through a connected fiber) to the same endpoint in the PIC. A fiber removed from one waveguide input (e.g., after a failure) can be re-attached to the other waveguide input in the redundant pair. This is discussed further with regard to FIGS. 1A-C. In an embodiment, additional mechanical support can be added for the fiber connection after the fiber is attached. For example, adhesive (e.g., non IM adhesive with fewer thermal requirements), a glass frit, or both, can be used.

In an embodiment, one or more of these techniques facilitate high throughput and high yield manufacturing. Further, one or more of these techniques support far-end fiber aggregation and connectorization. This can be done both pre- and post-fiber-to-PIC processing.

FIG. 1A illustrates an overview 100 of splicing optical fibers to a PIC, according to one embodiment. Numerous optical fibers 102A-N are attached to a PIC 110. In an embodiment, the optical fibers 102A-N can be any suitable optical fibers (e.g., SMF, PMF, MCF, or any other suitable optical fiber). Each of the optical fibers 102A-N is individually spliced to the PIC 110. For example, the optical fibers 102A-N can be directly spliced to the PIC 110 without use of IM epoxy (e.g., using instead laser splicing, laser spot welding, arc welding, or any other suitable technique). This is discussed further with regard to FIGS. 2-4, below.

The optical fibers 102A-N are attached to the PIC 110 at various attachment points 104A-N. In an embodiment, the attachment points 104A-N do not include IM epoxy, added before attachment, to facilitate optical transmission from the optical fibers 102A-N to the PIC 110. Instead, the attachment points 104A-N include a catalyst added prior to attachment, which can provide a permanent index match added after attachment (if necessary). For example, the attachment points 104A-N can include spin on glass (e.g., flowable oxide) or glass frits added between the optical fibers 102A-N and the PIC 110 prior to attachment. This can provide a permanent index match. In an embodiment, the spin on glass or glass frits can be cured using either temperature (e.g., a laser) or UV light after the fiber is aligned to the PIC. During the cure process, the glass flows or loses its semi-liquid state and transforms into a solid. Alternatively, or in addition, the attachment points 104A-N can include a catalyst added after alignment and attachment. Further, the attachment points 104A-N can include mechanical strain relief (e.g., non index-matching epoxy) add post attachment. In an embodiment, this mechanical strain relief is not index matching epoxy, is added post attachment, and is not used for index matching.

Figure 1B:
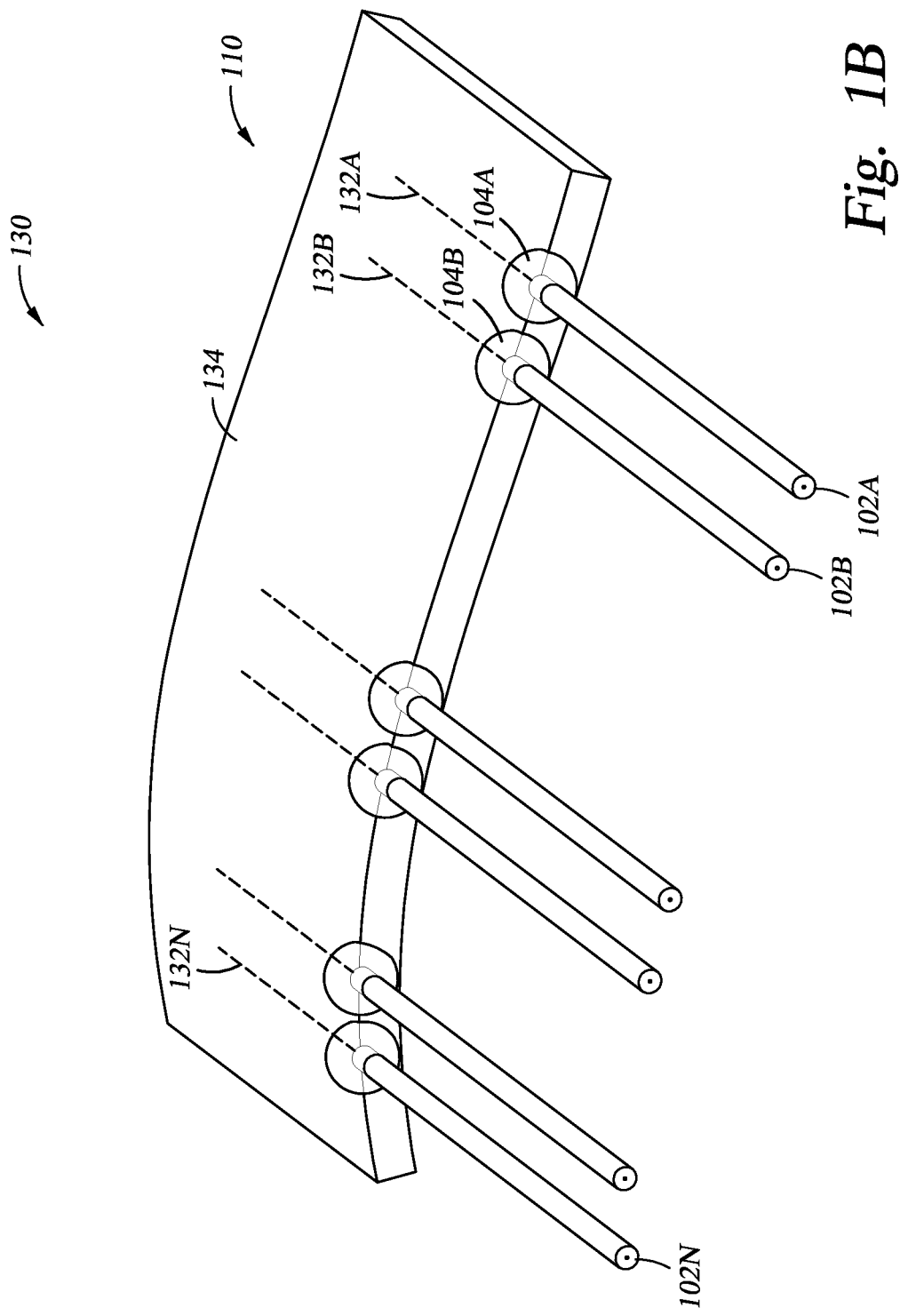
FIG. 1B illustrates an overview of splicing optical fibers to a PIC with warping, according to one embodiment.

FIG. 1B illustrates an overview 130 of splicing optical fibers to a PIC with warping, according to one embodiment. Multiple optical fibers 102A-N are again attached to the PIC 110. In an embodiment, the optical fibers 102A-N are each connected to a respective on-chip waveguide 132A-N using one of the attachment points 104A-N.

As illustrated, in an embodiment the PIC 110 include some warpage. This could make traditional techniques for connecting optical fibers to the PIC 110 challenging (e.g., aligning a pre-manufactured FAU). Instead, in an embodiment, each of the optical fibers 102A-N is individually aligned to the PIC 110 at the attachment points 104A-N. This avoids problems with the warpage of the PIC 110.

Further, the PIC 110 includes a redundant on-chip waveguide 134. In an embodiment, the redundant on-chip waveguide 134 is paired with another redundant on-chip waveguide (e.g., one of the on-chip waveguides 132A-N). If attachment of an optical fiber (e.g., one of the optical fibers 102A-N) to an on-chip waveguide (e.g., one of the on-chip waveguides 132A-N) fails, the optical fiber can be removed from the failed attachment and attached to the redundant on-chip waveguide 134 instead. This is discussed further with regard to FIG. 1C, below.

Figure 1C:
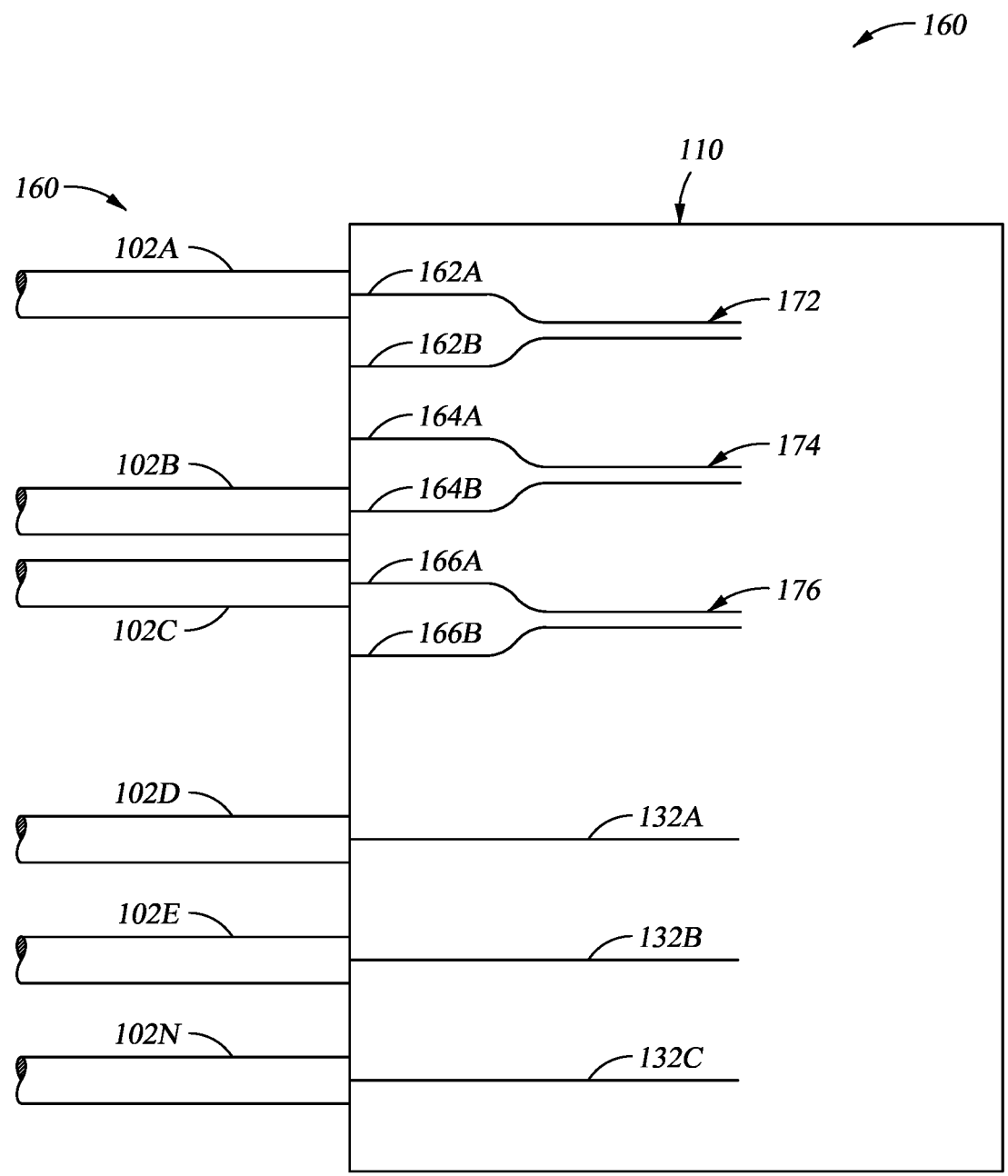
FIG. 1C illustrates a top view of splicing optical fibers to a PIC, according to one embodiment.

FIG. 1C illustrates a top view 160 of splicing optical fibers to a PIC, according to one embodiment. Multiple optical fibers 102A-N are connected to the PIC 110. In an embodiment, the optical fibers 102D-N are connected to respective individual on-chip waveguides 132A-C. For example, the optical fiber 102D is connected to the on-chip waveguide 132A, the optical fiber 102E is connected to the on-chip waveguide 1326, and the optical fiber 102N is connected to the on-chip waveguide 132C.

The optical fibers 102A, 1026, and 102C are each connected to one part of a redundant pair of on-chip waveguides 172, 174, and 176. For example, the optical fiber 102A is connected to the part 162A of the redundant pair of on-chip waveguides 172. The counterpart part 1626 is not connected to a fiber. The optical fiber 1026 is connected to the part 1646 of the redundant pair of on-chip waveguides 174. The counterpart part 164A is not connected to a fiber. The optical fiber 102C is connected to the part 166A of the redundant pair of on-chip waveguides 176. The counterpart part 166B is not connected to a fiber.

In an embodiment, the redundant pairs of on-chip waveguides 172, 174, and 176 facilitate re-connection of a fiber that fails to be connected to another on-chip waveguide. For example, the optical fiber 1026 could first have an attempted connection to the part 164A of the redundant pair of on-chip waveguides 174. The connection fails, and the optical fiber 102B is instead connected to the counterpart part 164B of the redundant pair of on-chip waveguides 174. In an embodiment, each part of each respective redundant pair of on-chip waveguides provides the same connection to the PIC. That is, in an embodiment, connecting the optical fiber 102B to the part 164B provides the same functionality as connecting the optical fiber 102B to the part 164A because both parts of the redundant pair of on-chip waveguides 174 provide the same connection to the PIC 110. Further, in an embodiment, the PIC 110 can include local keep out zones around the attachment areas (e.g., around the areas where the optical fibers 102A-N attach) to protect sensitive layers (e.g., metal layers) and to confine and localize heat generated during welding.

Figure 2:
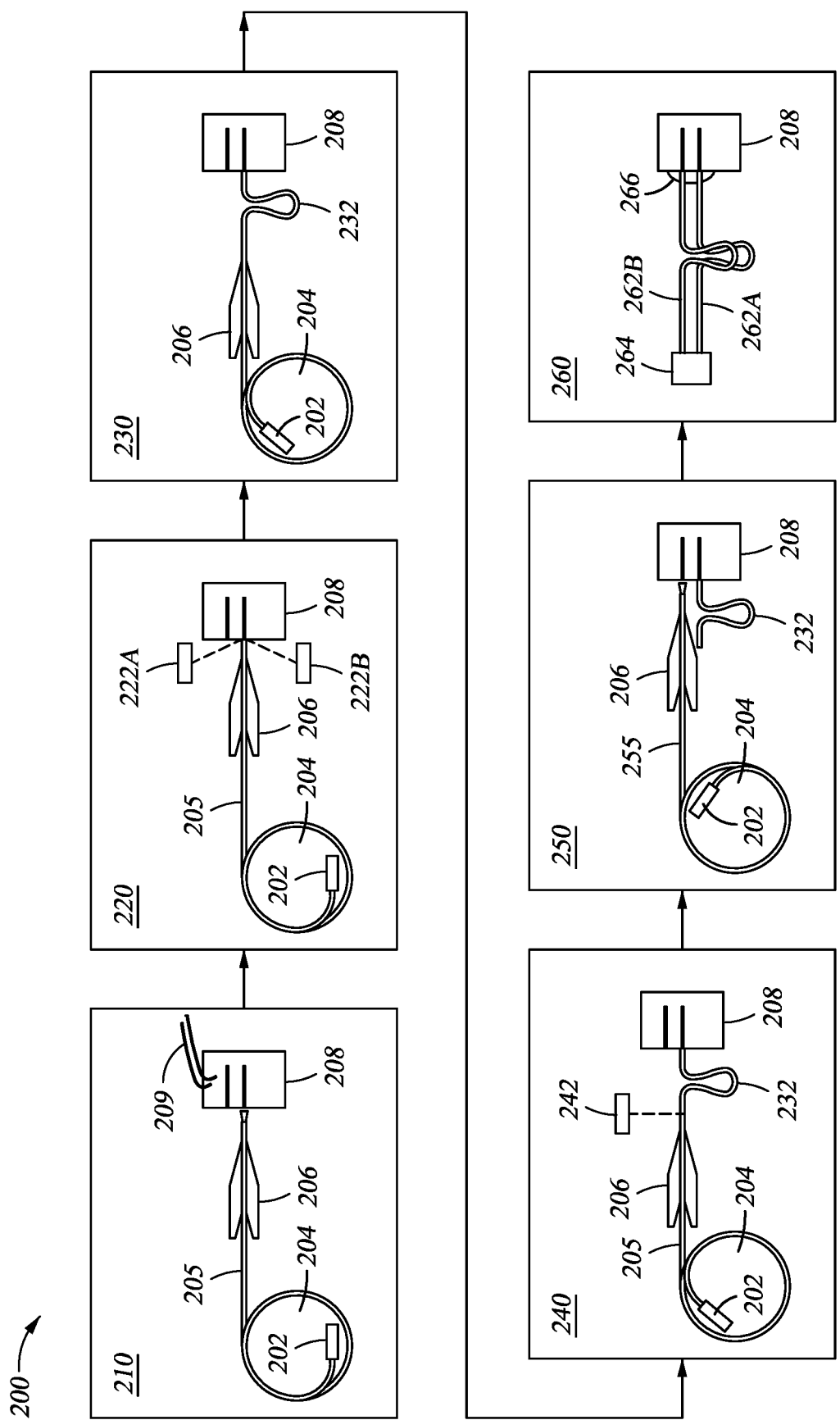
FIG. 2 illustrates assembly techniques for bare fiber attachment for connecting optical fibers to a PIC, according to one embodiment.

FIG. 2 illustrates assembly techniques 200 for bare fiber attachment for connecting optical fibers to a PIC, according to one embodiment. At block 210, an optical fiber 205 is unspooled from a fiber spool 204. A fiber nozzle 206 is used to align the optical fiber 205 with a PIC 208. For example, the fiber nozzle 206 can be used to align the optical fiber 205 with an on-chip waveguide on the PIC 208.

In an embodiment, the optical fiber 205 is actively aligned with the PIC 208 using one or more probes 209. For example, the optical fiber 205 can be illuminated from its far end using a laser 202. In an embodiment, the probes 209 are electrical probes used to identify photocurrent feedback at the PIC 208 from the laser 202 via the optical fiber 205. In an embodiment, the optical fiber 205 can be aligned along the x, y, and z axes. Further, if the optical fiber 205 is polarization sensitive it can be aligned in rotation as well (e.g., for PMF or MCF).

At block 220, the optical fiber 205 is attached to the PIC 208. For example, laser spots 222A and 222B can be used to laser weld the optical fiber 205 to the PIC 208. For example, the multiple laser spots 222A and 222B can be approximately 5-10 μm in size, and can be placed between contacts on the fiber 205 and a substrate (e.g., an $SiO_2$ or Si substrate) on the PIC 208 for attaching the aligned fiber place. In an embodiment, a catalyst (e.g., spin-on glass or glass frit) can be added between the fiber 205 and the PIC 208 before attachment and alignment, and can be used for index matching and structural support. This is discussed below, in relation to FIGS. 5A-B. Alternatively, elements 222A and 222B can be electrodes and can be used to arc weld the optical fiber 205 to the PIC 208. This is discussed below in relation to FIGS. 6A-B. As another example, the optical fiber 205 could be attached to the PIC 208 using laser splicing, as discussed below in relation to FIGS. 4A-B. These are merely examples, and the optical fiber 205 can be attached to the PIC 208 using any suitable technique.

In an embodiment, the optical fiber 205 can be offset from the PIC 208 (e.g., from an on-chip waveguide on the PIC 208) prior to attachment. This can be used to compensate for any asymmetry between the interfaces of the optical fiber 205 and the PIC 208 (e.g., vertical asymmetry). Further, in an embodiment, the optical fiber 205 can be pushed into the PIC 208 when an end portion near the PIC softens during welding (e.g., during laser welding or arc welding). This can remove, or lessen, any gaps or voids between the optical fiber 205 and the PIC 208.

At block 230, the fiber spool 204 can be used to dispense additional optical fiber. For example, the fiber spool 204 can dispense additional optical fiber to create a pigtail 232 with a desired length. As discussed in relation to blocks 240-260, the pigtail can be used to sever the optical fiber from the fiber spool 204 to allow connection of the optical fiber to another component (e.g., a fiber connector).

At block 240, the optical fiber is laser cleaved. For example, a laser 242 can be used to cleave the optical fiber from the fiber spool 204. In an embodiment, the optical fiber is cleaved at a point between the fiber nozzle 206 and the pigtail 232. This is merely one example.

At block 250, an additional optical fiber 255 is connected to the PIC 208. In an embodiment, blocks 210, 220, 230, and 240 are repeated for the additional optical fiber. This results in multiple optical fibers connected to the PIC 208 (e.g., to support multiple channels).

At block 260, the pigtails for the optical fibers connected to the PIC 208 are finalized. For example, the pigtails 262A and 262B are connectorized and connected to a fiber connector 264. In an embodiment, mechanical support can be added around the weld spots 266 to further support the connection of the optical fibers to the PIC 208.

Figure 3:
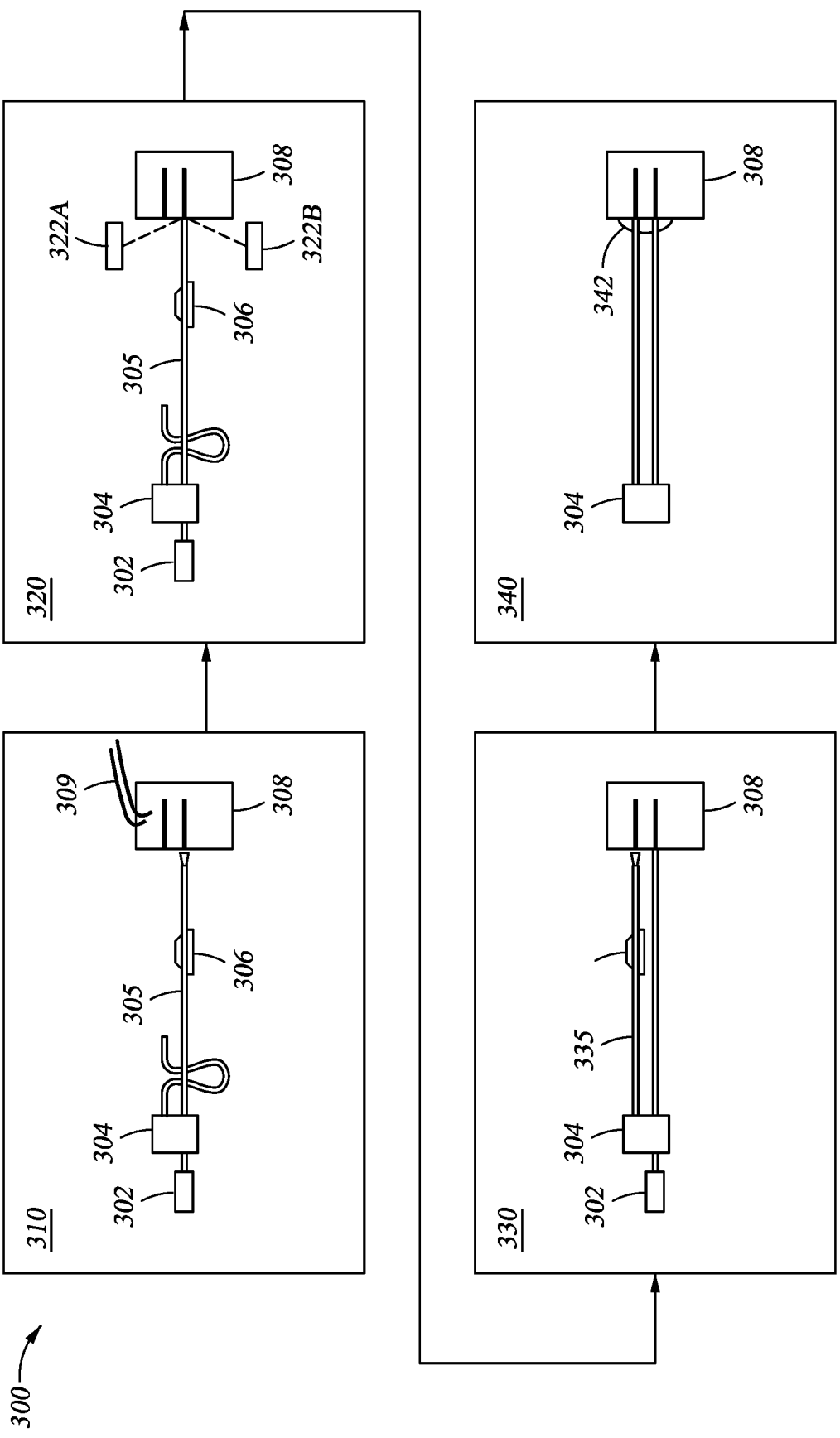
FIG. 3 illustrates assembly techniques for pre-connectorized fiber attachment for connecting optical fibers to a PIC, according to one embodiment.

FIG. 3 illustrates assembly techniques 300 for pre-connectorized fiber attachment for connecting optical fibers to a PIC, according to one embodiment. At block 310, an optical fiber 305 is pre-connected on one end to a fiber connector 304. The optical fiber 305 is aligned with a PIC 308 using a fiber holder 306. For example, the fiber holder 306 can be used to align the optical fiber 305 with an on-chip waveguide on the PIC 308.

In an embodiment, the optical fiber 305 is actively aligned with the PIC 308 using one or more probes 309. For example, the optical fiber 305 can be illuminated from its far end using a laser 302. In an embodiment, the probes 309 are electrical probes used to identify photocurrent feedback at the PIC 308 from the laser 302 via the optical fiber 305. In an embodiment, the optical fiber 305 can be aligned along the x, y, and z axes. Further, if the optical fiber 305 is polarization sensitive it can be aligned in rotation as well (e.g., for PMF or MCF).

At block 320, the optical fiber 305 is attached to the PIC 308. For example, lasers 322A and 322B can be used to laser weld the optical fiber 305 to the PIC 308. This is discussed below, in relation to FIGS. 5A-B. Alternatively, elements 322A and 322B can be electrodes and can be used to arc weld the optical fiber 305 to the PIC 308. This is discussed below in relation to FIGS. 6A-B. As another example, the optical fiber 305 could be attached to the PIC 308 using laser splicing, as discussed below in relation to FIGS. 4A-B. These are merely example, and the optical fiber 305 can be attached to the PIC 308 using any suitable technique.

In an embodiment, the optical fiber 305 can be offset from the PIC 308 (e.g., from an on-chip waveguide on the PIC 308) prior to attachment. This can be used to compensate for any asymmetry between the interfaces of the optical fiber 305 and the PIC 308 (e.g., vertical asymmetry). For example, the optical fiber 305 may shift during attachment (e.g., during welding) due to vertical asymmetry. The optical fiber 305 can have a vertical offset (e.g., 5 μm) added prior to attachment (e.g., prior to welding). Further, in an embodiment, the optical fiber 305 can be pushed into the PIC 308 when an end portion near the PIC 308 becomes soft during welding (e.g., during laser welding or arc welding). This can remove, or lessen, any gaps or voids between the optical fiber 305 and the PIC 308.

At block 330, an additional optical fiber 335 is connected to the PIC 308. In an embodiment, blocks 310 and 320 are repeated for the additional optical fiber. This results in multiple optical fibers connected to the PIC 308 (e.g., to support multiple channels).

At block 340, the connection of the optical fibers to the PIC 308 is finalized. In an embodiment, mechanical support can be added around the weld spots 342 to further support the connection of the optical fibers to the PIC 308.

Figure 4A:
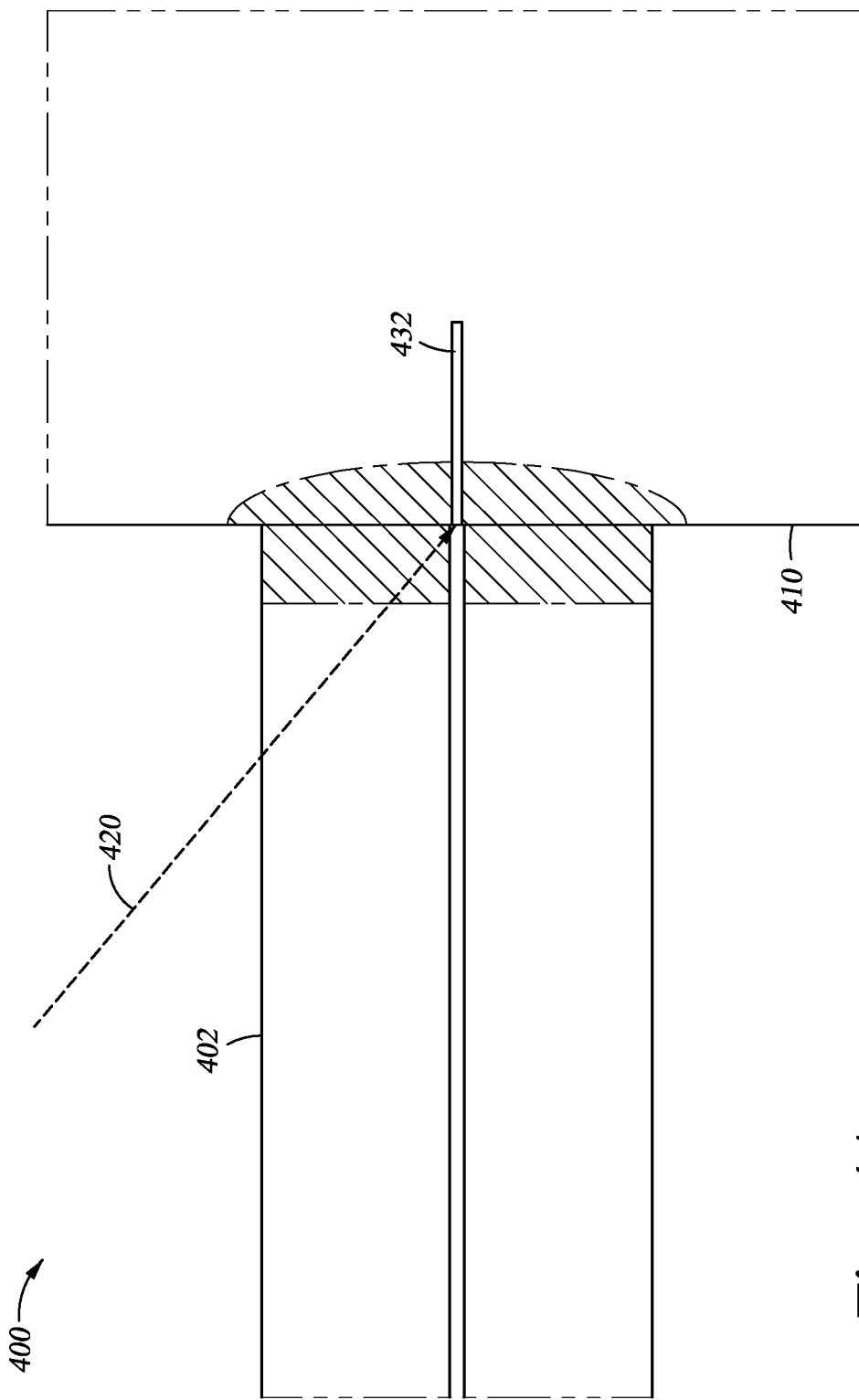
FIG. 4A illustrates a top view of laser splicing optical fibers to a PIC, according to one embodiment.

FIG. 4A illustrates a top view 400 of laser splicing optical fibers to a PIC, according to one embodiment. In an embodiment, an optical fiber 402 is connected to an on-chip waveguide 432 on a PIC 410 using a laser 420. For example, the laser 420 can be used to spot melt the optical fiber 402 from the center outwards. Further, the laser spot location can be biased away from the PIC 410 to maintain the substrate (e.g., SiO$_2$) and on-chip waveguide 432 at a lower temperature than the melt location.

In an embodiment, the optical fiber 402 can be pushed toward the PIC 410 when the fiber is soft (e.g., from heating) to close any voids or gaps between the optical fiber 402 and the PIC 410. Further, a catalyst (e.g., spin-on glass or glass frit) can be used between the optical fiber 402 and the PIC 410 (e.g., for index matching). This can be added prior to attachment and alignment between the optical fiber 402 and the PIC 410. In an embodiment, a glass frit can be highly doped to provide a low melting point. Glass frit may typically include a grain size on the order of 15-20 μm. For example, the optical fiber 402, the PIC 410 facet, or both, can be dipped in the catalyst prior to alignment. As another example, additional glass melt can be used after alignment around the fiber and PIC joint to provide mechanical support. Further, the optical fiber 402 can be connected to the PIC 410 at a vertical offset from the otherwise-maximum coupling location. This can help to compensate for drift during the process.

FIG. 4B illustrates a side view 450 of laser splicing optical fibers to a PIC, according to one embodiment. In an embodiment, FIG. 4B provides a side-view of the illustration in FIG. 4A. In an embodiment, an optical fiber 402 is connected to an on-chip waveguide 432 on a PIC 410 using a laser 420.

Figure 5A:
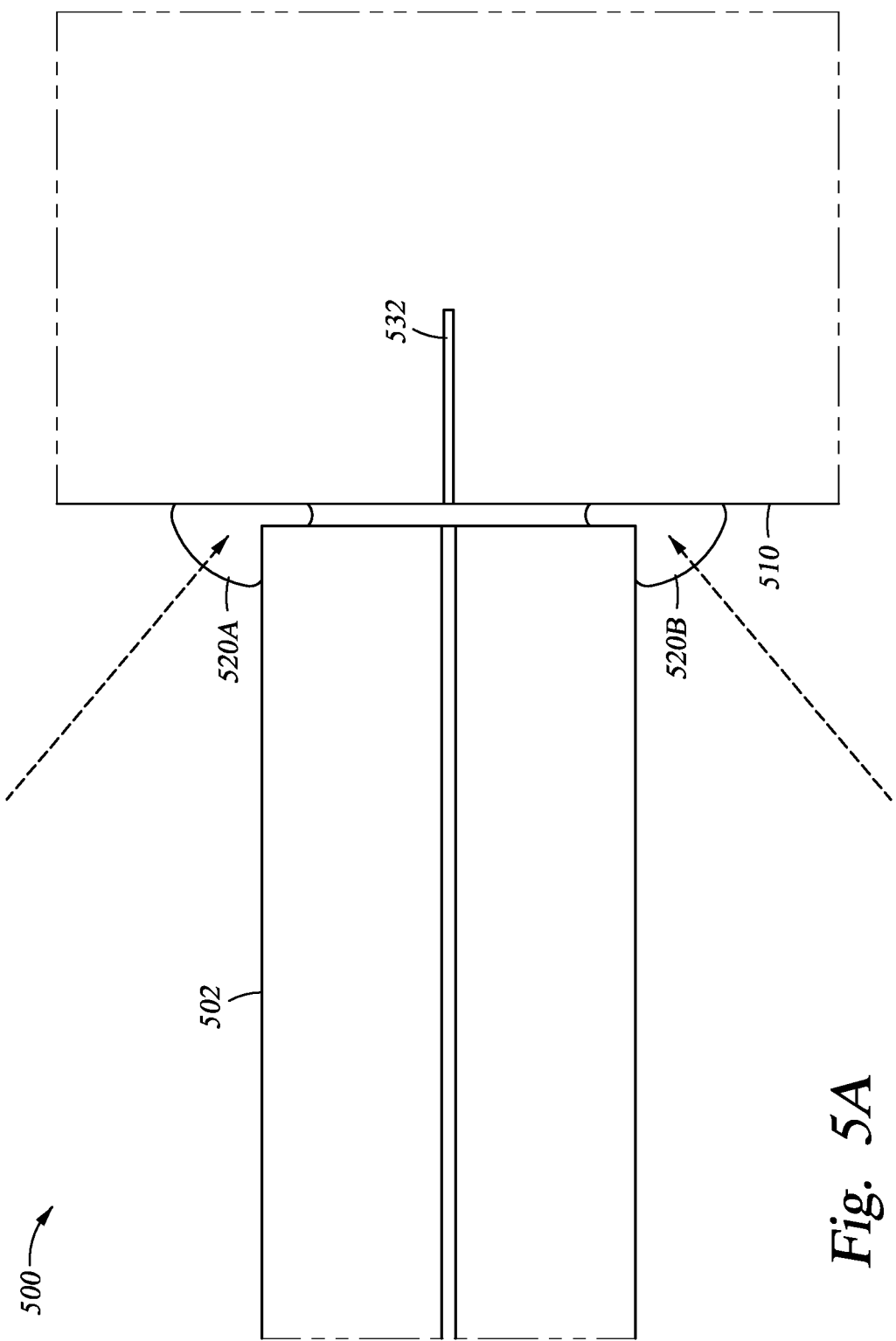
FIG. 5A illustrates a top view of laser spot welding optical fibers to a PIC, according to one embodiment.

FIG. 5A illustrates a top view 500 of laser spot welding optical fibers to a PIC, according to one embodiment. In an embodiment, an optical fiber 502 is connected to an on-chip waveguide 532 on a PIC 510 using multiple laser spots 520A and 520B. In an embodiment the laser spots are approximately 5-10 μm in size, and are placed between contacts on the optical fiber 502 and a substrate (e.g., an SiO$_2$ or Si substrate) for attaching the aligned fiber place.

Further, in an embodiment, an index matching backfill can be used to fill any void between the optical fiber 502 and the PIC 510. For example, a soft adhesive can be added, after connection, to provide index matching. In an embodiment, this adhesive can also provide strain relief. Further, in an embodiment, the backfill should not affect return loss or insertion loss. In an embodiment, the optical fiber 502 can be connected to the PIC 510 at an offset from the otherwise-maximum coupling location. This can help to compensate for drift during the process.

Figure 5B:
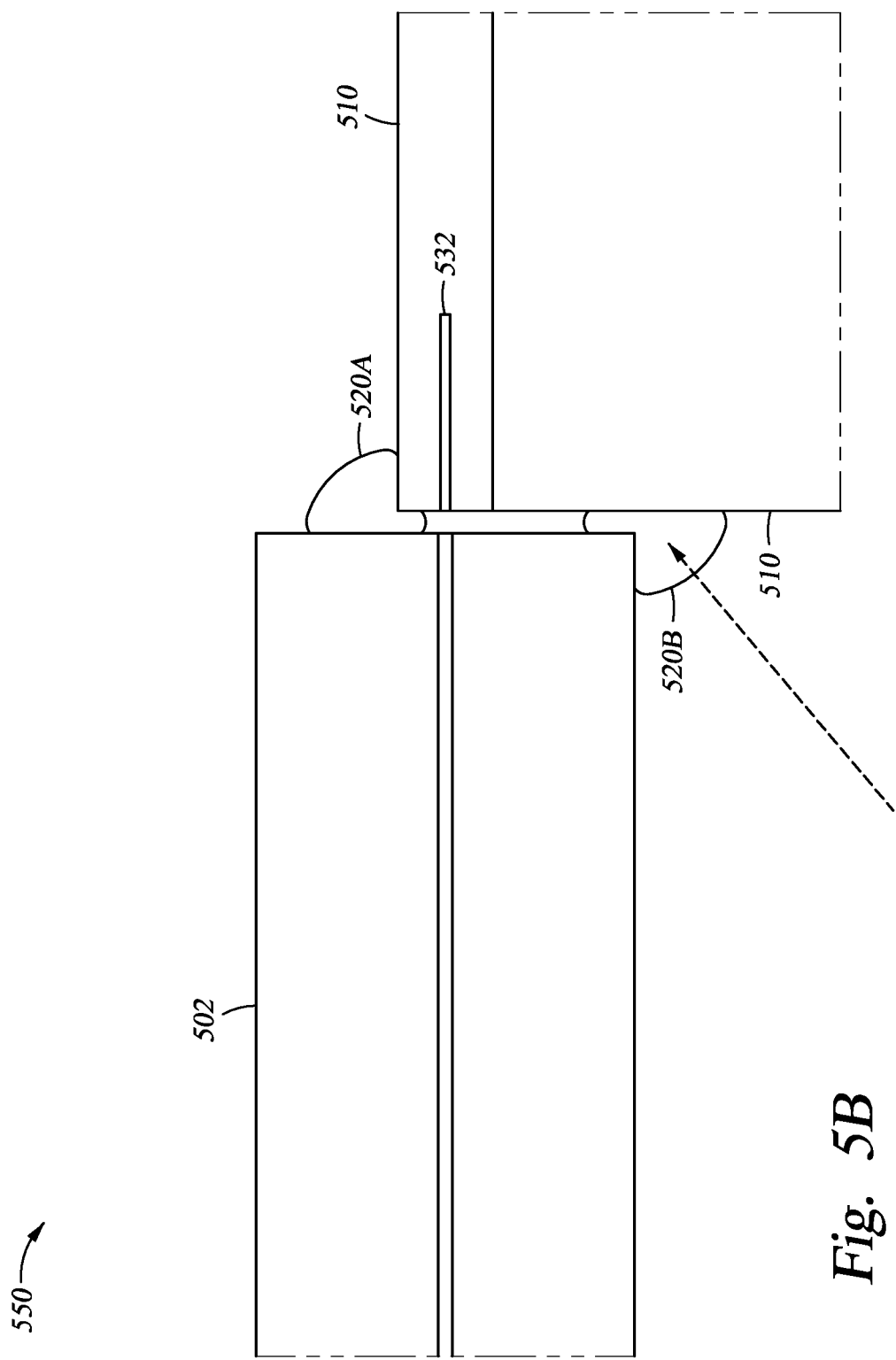
FIG. 5B illustrates a side view of laser spot welding optical fibers to a PIC, according to one embodiment.

FIG. 5B illustrates a side view 550 of laser spot welding optical fibers to a PIC, according to one embodiment. In an embodiment, FIG. 5B provides a side-view of the illustration in Figure BA. In an embodiment, an optical fiber 502 is connected to an on-chip waveguide 532 on a PIC 510 using laser spots 520A and 520B.

Figure 6A:
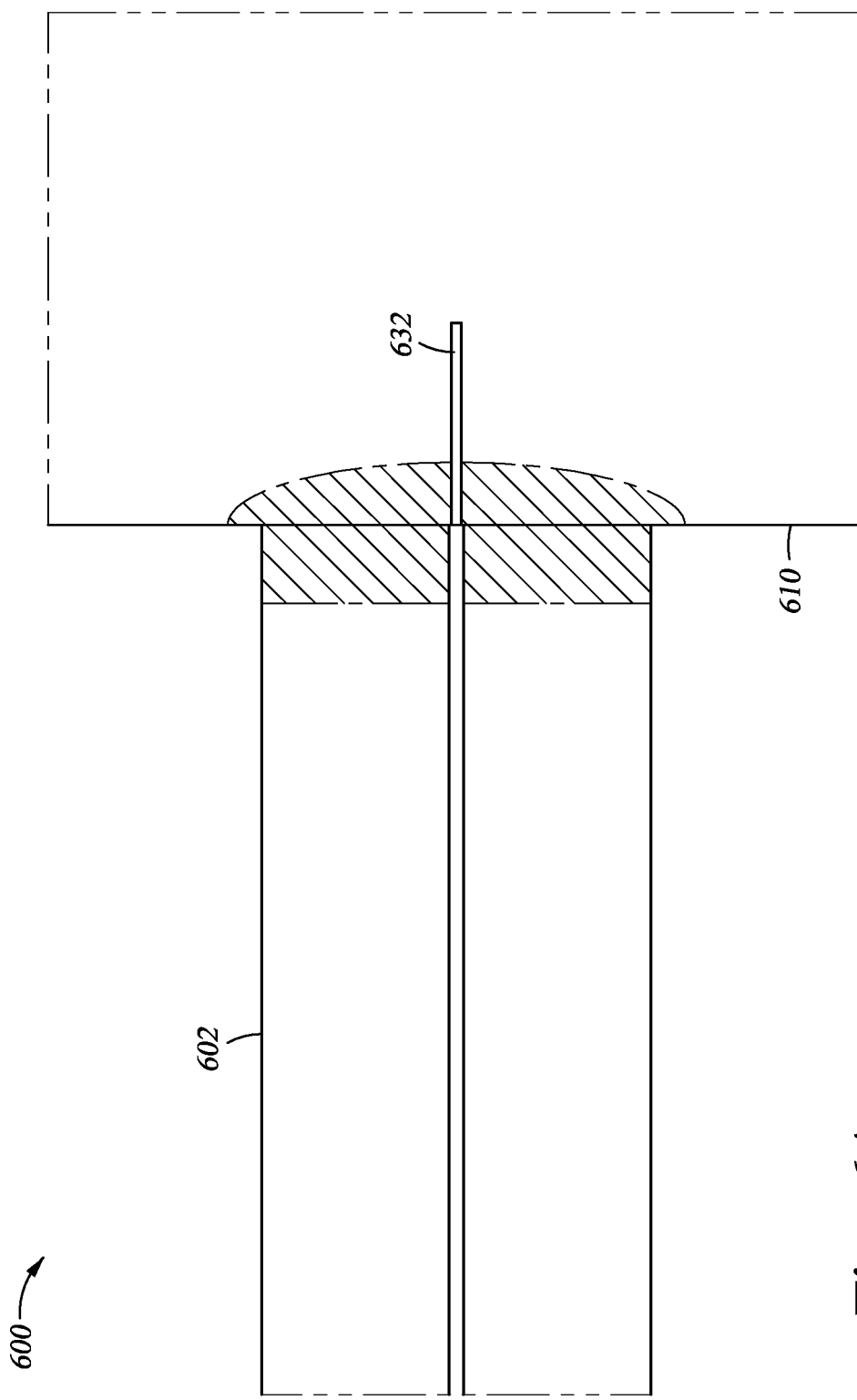
FIG. 6A illustrates a top view of arc welding optical fibers to a PIC, according to one embodiment.

FIG. 6A illustrates a top view 600 of arc welding optical fibers to a PIC, according to one embodiment. In an embodiment, an optical fiber 602 is connected to an on-chip waveguide 632 on a PIC 610 using a welding arc. In an embodiment, this provides similar outcomes to laser splicing discussed in relation to FIGS. 4A-B, above. For example, the arc location can be biased away from the PIC 610 to maintain the substrate (e.g., SiO$_2$) and on-chip waveguide 632 at a lower temperature than the melt location.

In an embodiment, the optical fiber 602 can be pushed toward the PIC 610 when it is soft (e.g., from heating) to close any voids or gaps between the optical fiber 602 and the PIC 610. Further, a catalyst (e.g., spin-on glass or glass frit) can be used between the optical fiber 602 and the PIC 610 (e.g., for index matching). In an embodiment, a glass frit can be highly doped to provide a low melting point. Glass frit may typically include a grain size on the order of 15-20 μm. For example, the optical fiber 602, the PIC 610 facet, or both, can be dipped in the catalyst prior to alignment. As another example, polycrystalline glass can be used post reflow to provide both index matching and mechanical support. Further, the optical fiber 602 can be connected to the PIC 610 at a vertical offset from the otherwise-maximum coupling location. This can help to compensate for drift during the process.

Figure 6B:
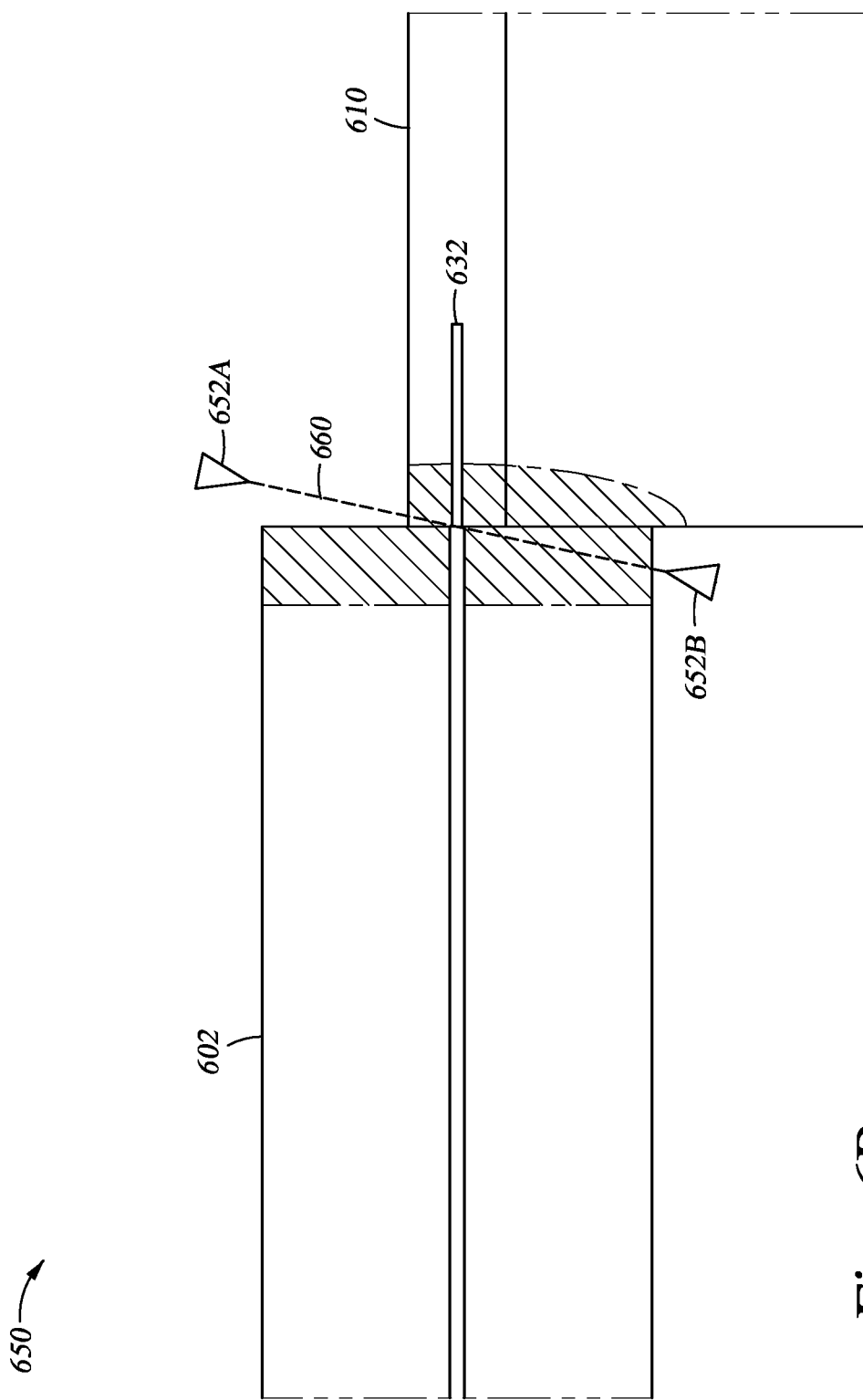
FIG. 6B illustrates a side view of arc welding optical fibers to a PIC, according to one embodiment.

FIG. 6B illustrates a side view 650 of arc welding optical fibers to a PIC, according to one embodiment. In an embodiment, FIG. 6B provides a side-view of the illustration in FIG. 6A. In an embodiment, an optical fiber 602 is connected to an on-chip waveguide 632 on a PIC 610 using a weld arc 660. For example, two electrodes 652A and 652B can be used to generate the weld arc 660 and connect the optical fiber 602 to the PIC 610.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   aligning each of a plurality of optical fibers for coupling to a photonic integrated circuit (PIC), comprising:
      detecting transmission from each respective optical fiber to the PIC using a probe, and aligning the respective optical fiber based on the detected transmission;
      identifying a failure in coupling a first optical fiber, of the plurality of optical fibers, to a first redundant waveguide on the PIC;
      based on the identified failure, coupling the first optical fiber to a second redundant waveguide on the PIC, wherein the first and second redundant waveguides are configured to provide an optical signal to a same endpoint on the PIC; and
      coupling each of the plurality of optical fibers to the PIC using at least one of: (i) laser splicing, (ii) laser spot welding, or (iii) arc welding.

2. The method of claim 1, wherein the coupling each of the plurality of optical fibers to the PIC uses laser spot welding using at least two laser spots.

3. The method of claim 1, wherein the coupling each of the plurality of optical fibers to the PIC uses arc welding using one or more electrodes.

4. The method of claim 1, wherein the coupling each of the plurality of optical fibers to the PIC does not use index matching epoxy between any of the plurality of fibers and the PIC.

5. The method of claim 1, wherein the coupling each of the plurality of optical fibers to the PIC further comprises:
using a catalyst material between each of the optical fibers and the PIC, the catalyst material comprising at least one of: (i) spin on glass or (ii) a glass frit.

6. The method of claim 1, wherein the coupling each of the plurality of optical fibers to the PIC further comprises:
pushing at least one of the plurality of optical fibers toward the PIC.

7. The method of claim 1, wherein the PIC comprises one or more zones configured to confine heat from the coupling of at least one of the plurality of optical fibers to the PIC, and wherein the one or more zones do not include a metal.

8. The method of claim 1, wherein the PIC comprises a first waveguide, and wherein a first optical fiber, of the plurality of optical fibers, is coupled to the waveguide at a vertical offset.

9. The method of claim 1, wherein the probe comprises an electrical probe and wherein detecting transmission from each respective optical fiber to the PIC using the probe comprises detecting photocurrent feedback.

10. A method, comprising:
aligning each of a plurality of optical fibers for coupling to a photonic integrated circuit (PIC), comprising:
detecting transmission from each respective optical fiber to the PIC using a probe, and aligning the respective optical fiber based on the detected transmission; and
coupling each of the plurality of optical fibers to the PIC, comprising:
identifying a failure in coupling a first optical fiber, of the plurality of optical fibers, to a first redundant waveguide on the PIC; and
based on the identified failure, coupling the first optical fiber to a second redundant waveguide on the PIC, wherein the first and second redundant waveguides are configured to provide an optical signal to a same endpoint on the PIC.

11. The method of claim 10, wherein the coupling each of the plurality of optical fibers to the PIC does not use a fiber array unit (FAU).

12. The method of claim 10, wherein the coupling each of the plurality of optical fibers to the PIC does not use index matching epoxy between any of the plurality of fibers and the PIC.

13. The method of claim 10, wherein the coupling each of the plurality of optical fibers to the PIC further comprises:
using a catalyst material between each of the optical fibers and the PIC, the catalyst material comprising at least one of: (i) spin on glass or (ii) a glass frit.

14. The method of claim 10, wherein the PIC comprises one or more zones configured to confine heat from the coupling of at least one of the plurality of optical fibers to the PIC, and wherein the one or more zones do not include a metal.

15. A system, comprising:
a photonic integrated circuit (PIC); and
a plurality of optical fibers individually coupled to the PIC without using a fiber array unit (FAU),
wherein each of the plurality of optical fibers is configured to be individually aligned with the PIC during coupling of the optical fibers to the PIC,
wherein the each of the plurality of optical fibers is aligned with the PIC using a probe to detect feedback from a respective optical fiber to the PIC;
wherein the PIC comprises first and second redundant waveguides configured to provide an optical signal to a same endpoint on the PIC, and wherein a first optical fiber, of the plurality of optical fibers, is coupled to the second redundant waveguide, for transmission of the optical signal to the endpoint on the PIC, based on an attempted coupling and failure in coupling the first optical fiber to the first redundant waveguide.

16. The system of claim 15, wherein the plurality of optical fibers are individually coupled to the PIC using at least one of: (i) laser splicing, (ii) laser spot welding, or (iii) arc welding.

17. The system of claim 15, wherein each of the plurality of optical fibers is individually coupled to the PIC using laser spot welding using at least two laser spots.

18. The system of claim 15, wherein each of the plurality of optical fibers is individually coupled to the PIC using arc welding using one or more electrodes.

* * * * *

UNITED STATES PATENT AND TRADEMARK OFFICE
CERTIFICATE OF CORRECTION

| | | |
|---|---|---|
| PATENT NO. | : 11,675,130 B2 | |
| APPLICATION NO. | : 17/447145 | |
| DATED | : June 13, 2023 | |
| INVENTOR(S) | : Norbert Schlepple et al. | |

It is certified that error appears in the above-identified patent and that said Letters Patent is hereby corrected as shown below:

In the Specification

In Column 8, Line 25, delete "Figure BA." and insert -- FIG. 5A. --.

Signed and Sealed this
Thirteenth Day of August, 2024

Katherine Kelly Vidal
*Director of the United States Patent and Trademark Office*